Dec. 16, 1947.   M. C. DEPP ET AL   2,432,514
ADJUSTABLE FLUX VALVE
Filed March 27, 1945

INVENTORS
MARLIN C. DEPP
CAESAR F. FRAGOLA
BY
Herbert H. Thompson
ATTORNEY.

Patented Dec. 16, 1947

2,432,514

UNITED STATES PATENT OFFICE 2,432,514

ADJUSTABLE FLUX VALVE

Marlin C. Depp, Hempstead, and Caesar F. Fragola, East Hempstead, N. Y., assignors to Sperry Gyroscope Company, Inc., a corporation of New York Application March 27, 1945, Serial No. 585,090

9 Claims. (Cl. 177—351)

1

Our invention generally relates to flux valves and particularly relates to a construction affording ready adjustment of the component parts of the valve, and to a means of making such adjustment; whereby to improve the character of the signal voltage output of the device.

Flux valves are devices of fairly recent origin which react with an external unidirectional field, such as the earth's field, to provide a measure of the intensity of the field or an indication of its direction. Such a device is admirably adapted for use in compass systems since the voltage outputs thereof may be connected to control a repeater which will serve substantially continuously to provide an indication of the direction of the magnetic meridian.

Flux valves are usually arranged to comprise a plurality of legs relatively angularly arranged in radial, or star, or delta, each leg providing a signal voltage output which varies in magnitude as a cosine function of the angle between the longitudinal axis of the leg and the direction of the external field. Hence, if the output circuits of the respective legs are connected together in Δ or Y fashion, they may be used to control a repeater having a similarly arranged polycircuit stator as hereinafter more fully described.

Each leg of a flux valve may be considered as a separate unit and comprises an inductor including one or more core members of permeable magnetic material through which an exciting flux is pulsed in order that the unidirectional flux of the external field will be caused to pulse and thereby produce a signal voltage in the output winding or secondary which is produced through interaction between the device and the external field. Ordinarily, an alternating current and exciting windings are applied to the inductor to produce excitation or a periodically varying flux therein, and because of the close association of the primary or exciting winding, the inductors and the secondary or output windings, voltages of exciting or fundamental frequency appear in the output. The signal voltages, which are the desirable voltage components in the output of the valve and which are produced through interaction with the external field, are second harmonic voltages or have a frequency twice that of the fundamental or the frequency of variation of the exciting current. When components of fundamental frequency appear in the output they greatly distort the second harmonic signal voltage and produce spurious error voltages in the flux valve output.

It is the primary purpose of the present invention to provide a flux valve or a component unitary part of a multilegged flux valve which is so constructed and arranged that it may be easily adjusted to reduce the voltage components of fundamental frequency or exciting frequency to a minimum in the flux valve output, or substantially entirely to eliminate such undesired fundamental voltage components.

It is another object of the present invention to provide a flux valve or a unitary flux valve leg which is extremely simple in construction and readily assembled and adjusted to provide substantially second harmonic signal voltage components only in the output.

Still another object of this invention is to provide matched units of substantially equal signal characteristics such that substantially perfect 800 cycle definition, assuming 400 cycle excitation, will be obtained as the valve is rotated in a uniform magnetic field or in azimuth in the earth's magnetic field.

With the foregoing and still other objects in view, our invention includes the novel elements and the combinations and relative arrangements thereof, described below and illustrated in the accompanying drawings, in which—

Figure 1:
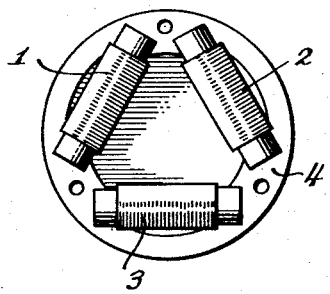
Fig. 1 is a plan view of a three-legged flux valve together with one form of mounting for supporting the legs thereof in fixed relative angular relationship.
Figure 3:
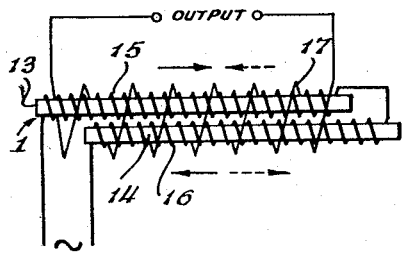
Figure 4:
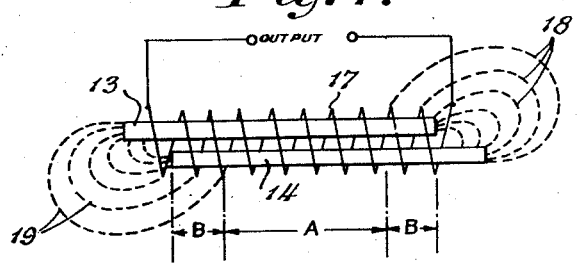
Figure 5:
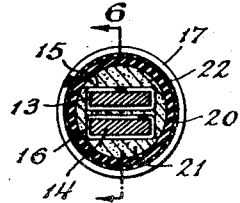
Figure 6:
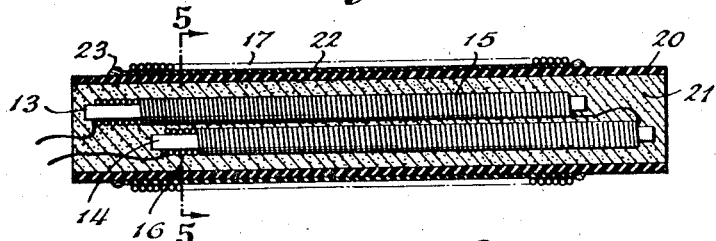
Figure 7:
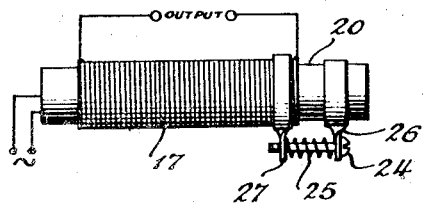
Figure 8:
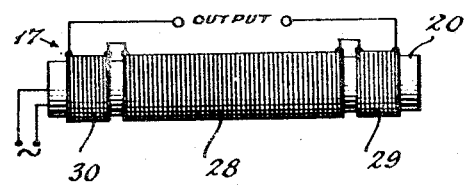

Fig. 3 somewhat schematically represents the construction of one leg of the flux valve of Fig. 1;

Fig. 4 is a view similar to Fig. 3, illustrating the general nature of the asymmetrical flux leakage at the ends of the core members;

Fig. 5 is a sectional end view taken in about the plane 5—5 of Fig. 6 showing a preferred construction of unitary flux valve leg with its parts arranged in accordance with the present invention;

Fig. 6 is a longitudinal sectional view of the flux valve leg of Fig. 5 taken in about the plane 6—6 thereof;

Fig. 7 is a side elevation view of a unitary flux valve leg showing one method of adjusting the pickup winding relative to the cores; and Fig. 8 is a side elevation view of a modified form of flux valve leg.

It will be understood that the present invention is herein principally illustrated and described as a unitary device, and also as one of the legs of a multilegged flux valve. Such a unitary flux valve leg may be used alone or in combination with other legs, for example, as shown in Fig. 1. In the former case, the voltage output of the leg will be maximum when paralleling the direction of the earth's field and will reduce to zero when the leg is positioned in substantially an east-west direction. In the latter case, the flux valve will provide a plurality of voltage outputs each of which will depend in magnitude upon the relationship between the lonigtudinal axes of the core legs and the direction of the earth's field, whereby to provide an output which will control a repeater to provide a 360° indication. A single leg, of course, cannot alone serve adequately in a compass system to control a 360° indicator. However, the present invention relates to the formation and separate adjustment of each leg whereby to improve the leg construction and the accuracy of the output of a multilegged flux valve.

Figure 2:
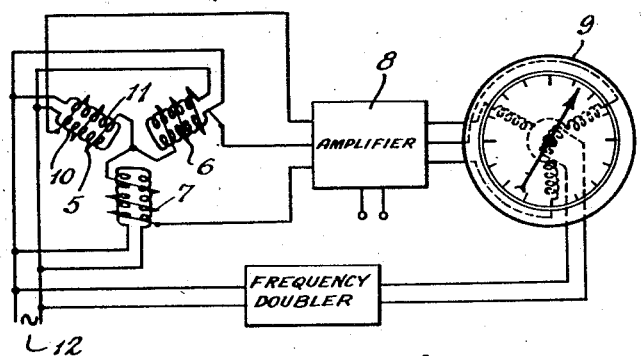
Fig. 2 is a wiring diagram of the valve of Fig. 1 showing it connected in a compass system.

In Fig. 1, therefore, we have shown a multilegged flux valve comprising the three legs indicated generally at 1, 2 and 3, each of which is preferably formed in the manner shown in Figs. 3 and 4. The legs 1, 2 and 3 are supported in predetermined relative angular relationship by the base 4 which may be formed with recesses to accommodate the units and to which a retaining ring may be securely fastened to hold the legs in the positions shown. As illustrated in Fig. 2, the secondary or pickup windings 5, 6 and 7 of the respective legs may be Y-connected as shown and connected through an amplifier 8 to a repeater 9. The exciting coils 10 and 11 of each leg may be connected together in series and across a source 12 of periodically varying, preferably alternating current as shown. Since the system of Fig. 2 does not, per se, form any part of the present invention, the foregoing is believed sufficient for the purpose of showing one manner in which the units of the present invention may be connected together and in circuit in a compass system or the like.

The present invention will best be understood by reference to Figs. 3 and 4 wherein we have schematically shown the construction of a flux valve leg or unit. Each leg 1, 2 or 3 as the case may be comprises an inductor which includes a pair of laterally spaced, elongated core members 13 and 14 of permeable magnetic material, such as Permalloy or the like. These members, of course, preferably extend in parallel relationship. In the embodiment illustrated, each core member is provided with an exciting winding 15 and 16, respectively, which are connected together in series and across the source 12 of alternating current. The alternating current will produce periodically varying or alternating fluxes in the core members 13 and 14 and at any one instant the fluxes flowing in the two core members will respectively flow in relatively opposite directions as indicated by the arrows in full and dotted lines. the full-line arrows indicate an assumed direction of flow of flux for one instant while the dotted line arrows represent an assumed direction of flow of the flux upon a reversal of the a. c. current. Under these conditions, flux will circulate through the two core members reversing its direction of circulation with each alternation of current. A pickup winding 17 is arranged so that the convolutions thereof each encircle both core members. The exciting windings 15 and 16, of course, correspond to the windings 10 and 11 of Fig. 2 while the pickup or secondary winding 17 corresponds to any one of windings 5, 6, and 7 of Fig. 2.

It should be observed that by arranging the pickup winding in the manner shown in Fig. 3, wherein its convolutions encircle both core members 13 and 14 that voltage components induced therein by the exciting winding 15 will oppose and buck those which are induced therein by the exciting winding 16. If the voltage components induced in the winding 17 by the exciting windings 15 and 16 are exactly equal they will, of course, buck out and reduce to zero leaving in the output of winding 17 only second harmonic or double frequency voltage components which are the desired signal voltages produced through interaction of the device with the external magnetic field.

In accordance with the present invention, we arrange the two core members 13 and 14 so that the first thereof, such as 13, extends axially and longitudinally beyond the second core member 14 at one end, while core member 14 extends axially and longitudinally beyond the core member 13 at the other end. Preferably, the axially extending end portions of each core member are substantially equal in length. With this relative arrangement of core members, an asymmetrical leakage of flux will occur and the leakage flux at opposite ends will be 180° out of phase. These asymmetrical leakage fluxes are represented by the dash lines which are indicated respectively by the reference numerals 18 and 19. Therefore, linkage of the leakage flux 18 with the pickup winding 17 will produce voltages 180° out of phase with those voltages which are produced through linkage of the leakage flux 19 with the pickup winding. Throughout the major portion of the zone in which the two core members overlap each other, there will exist low flux leakage and what leakage does exist will be of a generally symmetrical nature.

In the above pointed out construction providing flux leakages of the character referred to, it will be observed that if the pickup coil 17 be moved, for example, to the right as viewed in Fig. 4, it being understood that the core members are fixed in relation to each other but movable as a unit relative to the pickup winding, that more of the leakage flux 18 will link therewith and produce a greater voltage component of fundamental frequency in the pickup winding 17 which has a phase dependent upon the phase of leakage flux 18. If the coil be moved toward the left as viewed in Fig. 4, larger voltages of a phase dependent upon the phase of leakage flux 19 will be developed in the pickup winding. Hence, the pickup winding and core structure may be relatively adjusted in a longitudinal or axial direction simultaneously to vary the linkage of the leakage flux 18 and 19 with the pickup winding and thereby differentially control the 180° out of phase components of fundamental frequency which are developed in the output. Obviously, under the foregoing conditions, the fundamental voltage components may be eliminated or at least reduced to a negligible minimum.

In Figs. 5 and 6, we have shown a preferred embodiment of the flux valve leg unit of our present invention. The two core members 13 and 14 in the exemplary arrangements shown are each surrounded respectively by the exciting windings 15 and 16 and are contained in desired relative relationship within a cylinder 20 of any suitable non-magnetic material. The core members and the windings thereon may be retained in the position shown by filling, wholly or in part, the cylinder with some suitable sealing compound or thermo-plastic material such for example as "Lucite" which is methyl methacrylate, a polymerized derivative of methacrylic acid. "Lucite" has an extremely low molding temperature and may be employed to form a suitable binder to hold the exciting coils and the core members in fixed relative relation or within the tube or cylindrical form 20. This binding medium is indicated at 21 in Fig. 6. The secondary or pickup winding 17 may be mounted on a suitable cylindrical form 22 preferably of electrical insulating material which is adapted slidably to fit over the cylinder 20, whereby the pickup winding and cores may be relatively and axially adjusted as hereinabove described. When the proper adjustment has been made, the coil 17 may be bonded to the cylinder 20 by means of a suitable lacquer or a sealing compound such as indicated at 23. The unit when so adjusted and with the parts fixed against relative axial movement may then be inserted as one of the legs of a multilegged flux valve of the character shown in Figs. 1 and 2, or, of course, used as in individual unit.

In Fig. 7 we have shown a slight modification of our invention wherein the pickup winding 17 may be adjusted relative to the cylinder 20 or the core members by means of screw 24. A helical spring 25 is compressed between the lugs 26 and 27 which are secured respectively to the cylinder 20 and the pickup winding 17 while screw 24 passes through lug 26 and is threaded in lug 27. The parts 24 through 27 are of course preferably formed of non-magnetic material.

In Fig. 8 we have shown a modified form of our invention in which the secondary or pickup winding 17 comprises three separate coils 28, 29 and 30. The coils 28, 29 and 30 are connected in series and the central coil 28 is fixed in relation to the core structure and preferably so disposed that it will be linked only with symmetrical leakage flux and not with the end, asymmetrical leakage fluxes 18 and 19. The two end coils 29 and 30 are both initially movable and are designed respectively to link with the asymmetrical end leakage fluxes 18 and 19. Obviously, relative axial movement between the coils 29 and 30 and the core structures will vary the linkage therewith of the fluxes 18 and 19 whereby the fundamental voltage components may be eliminated in the output in a manner similar to that hereinabove described in connection with the device of Fig. 4.

While we have described our invention in its preferred embodiments it is to be understood that the words which we have used are words of description rather than of limitation and that changes within the purview of the appended claims may be made without departing from the true scope and spirit of our invention in its broader aspects.

What is claimed is:

1. In a flux valve of the character described for supplying a potential output dependent in magnitude upon the direction of an external magnetic field relative thereto, an inductor comprising a pair of laterally spaced, elongated core members of permeable magnetic material so relatively arranged that a first thereof extends axially beyond a second at one end while the second extends axially beyond the first at the other end, means for causing exciting fluxes to circulate through said inductor whereby asymmetrical flux leakage occurs at the ends thereof, and a pickup winding having convolutions extending about both core members.

2. A flux valve of the character recited in claim 1, in which the core members are of substantially uniform cross-sectional area throughout the major portion of the lengths thereof.

3. A flux valve of the character recited in claim 1 in which the means for causing exciting fluxes to circulate through said inductor includes a source of alternating current.

4. In a flux valve of the character described for supplying a potential output dependent in magnitude upon the direction of an external magnetic field relative thereto, an inductor comprising a pair of laterally spaced, elongated core members of permeable magnetic material so relatively arranged that a first thereof extends axially beyond a second at one end while the second extends axially beyond the first at the other end, means including an exciting winding on each of said core members for producing a flux flowing in said members in relatively and simultaneously opposite directions whereby asymmetrical flux leakage occurs at the ends of said inductor, and a pickup winding having its convolutions extending about both core members and in part in flux-linking relation to said asymmetrical leakage fluxes.

5. A flux valve of the character recited in claim 4 in which the exciting winding of each core member is energized from an alternating current source.

6. In a flux valve of the character described for supplying a potential output dependent in magnitude upon the direction of an external magnetic field relative thereto, an inductor comprising a pair of laterally spaced, elongated core members of permeable magnetic material so relatively arranged that a first thereof extends axially beyond a second at one end while the second extends axially beyond the first at the other end, said extending portions being substantially of equal lengths, an exciting winding adapted when connected to a source of pulsating electrical energy to produce a pulsating flux in said core members, the fluxes in said members flowing simultaneously in opposite directions, and a pickup winding having convolutions extending about both core members.

7. In a flux valve of the character described for supplying a potential output dependent in magnitude upon the direction of an external magnetic field relative thereto, an inductor comprising a pair of laterally spaced, elongated core members of permeable magnetic material so relatively arranged that a first thereof extends axially beyond a second at one end while the second extends axially beyond the first at the other end, means for causing exciting fluxes to circulate through said inductor whereby asymmetrical flux leakage occurs at the ends thereof, a pickup winding having convolutions extending about both core members, and means for differentially varying the linkage of leakage flux with said pickup winding.

8. In a flux valve of the character described for supplying a potential output dependent in magnitude upon the direction of an external magnetic field relative thereto, an inductor comprising a pair of laterally spaced, elongated core members of permeable magnetic material so relatively arranged that a first thereof extends axially beyond a second at one end while the second extends axially beyond the first at the other end, means including a winding on each core member for producing substantially equal and pulsating fluxes in said core members, the flux in one thereof flowing in the opposite direction to that in the other, whereby asymmetrical flux leakage occurs at the ends thereof, and a pickup winding having convolutions extending about both core members.

9. In a flux valve of the character described for supplying a potential output dependent in magnitude upon the direction of an external magnetic field relative thereto, an inductor comprising a pair of laterally spaced, elongated core members of permeable magnetic material so relatively arranged that a first thereof extends axially beyond a second at one end while the second extends axially beyond the first at the other end, means for causing exciting fluxes to circulate through said inductor whereby asymmetrical flux leakage occurs at the ends thereof, and a pickup winding including separate coils connected in series and arranged with their convolutions extending about both core members, one of said pickup coils being centrally positioned to link substantially only with symmetrical flux leakage, while the coil at both ends thereof being positioned in flux-linking relation with both symmetrical and asymmetrical flux leakage.

MARLIN C. DEPP.
CAESAR F. FRAGOLA.

REFERENCES CITED

The following references are of record in the file of this patent:

UNITED STATES PATENTS

| Number | Name | Date |
| --- | --- | --- |
| 2,384,819 | Depp | Sept. 18, 1945 |
| 1,863,415 | Ruber | June 14, 1932 |
| 1,886,336 | Gunn | Nov. 1, 1932 |
| 2,047,609 | Antranikian | July 14, 1936 |
| 2,158,500 | Guerra | May 16, 1939 |